United States Patent [19]

Noiron et al.

[11] Patent Number: 4,994,182
[45] Date of Patent: Feb. 19, 1991

[54] APPARATUS FOR THE THICKENING BY FLOATATION OF SLURRIES PRODUCED DURING THE TREATMENT OF WATERS

[75] Inventors: Jean-Jacques Noiron, Franconville; Gérard Rondeau, Bougival, both of France

[73] Assignee: Degremont, Rueil Malmaison, France

[21] Appl. No.: 362,656

[22] Filed: Jun. 7, 1989

[30] Foreign Application Priority Data

Jun. 30, 1988 [FR] France ................ 88 08852

[51] Int. Cl.⁵ .............................. B01D 21/06
[52] U.S. Cl. .................. 210/241; 210/251; 210/528; 210/530; 210/538
[58] Field of Search ............ 210/221.1, 221.2, 528, 210/530, 538-540, 603, 241, 251

[56] References Cited

U.S. PATENT DOCUMENTS 1,625,721 4/1927 Hahn .................... 210/528
4,022,697 5/1977 Pankuch ................ 210/530

FOREIGN PATENT DOCUMENTS 3103037 8/1982 Fed. Rep. of Germany.
3443875 6/1986 Fed. Rep. of Germany.
2097874 3/1972 France.
2382265 9/1978 France.
2547294 12/1984 France.
605678 7/1948 United Kingdom ........ 210/528

Primary Examiner—W. Gary Jones
Assistant Examiner—Matthew O. Savage
Attorney, Agent, or Firm—Sandler, Greenblum & Bernstein

[57] ABSTRACT

An apparatus for thickening by flotation suspensions contained in a liquid, notably slurries produced during treatment of residual water, formed of a circular basin having a scraping system, the scraping members of which are supported by arms connected to a central device driving them in rotation, or a similar apparatus, and having a flexible cover rotating with the scraping system arms wherein the arms provide the supports for the cover.

10 Claims, 3 Drawing Sheets

APPARATUS FOR THE THICKENING BY FLOTATION OF SLURRIES PRODUCED DURING THE TREATMENT OF WATERS

BACKGROUND OF THE INVENTION

1. Field of the Invention

The present invention relates to an improved apparatus for the thickening by flotation of slurries produced during the treatment, notably by activated slurries, of residual, urban or industrial waters.

2. Background and Relevant Materials

Presently for the thickening of slurries arising from the treatment of residual, urban or industrial waters, one resorts frequently to the flotation technique consisting substantially of introducing into a suspension of the slurry to be thickened a pressurized fluid, generally water into which air under pressure has been introduced and which is expanded so as to cause the formation of fine bubbles which unite themselves to the slurry particles and drive them into an ascending movement, thereby bringing them to the free surface of the liquid from which they are eliminated, generally by scraping.

This technique is implemented in an apparatus, called flotation equipment, which has circular or rectangular shape and includes a scraping system for the discharge of the slurries.

After a certain period of operation of said apparatus and due to the flotation phenomenon, the slurry particles mixed with the air bubbles concentrate and form, at the surface of the apparatus, a floating mattress.

A disagreeable smell which is noxious for the environment is released from this apparatus. Therefore, it is most often necessary to cover this apparatus with a structure which is a function of the shape of the structure and of the type of scraping used.

The solutions generally used for covering the rectangular or circular basins having a peripherally driven scraping equipment are:

the installation of the structure inside a building; an inflatable or rigid cover composed of a synthetic material surrounding the whole of the structure.

With these types of installations, the main mechanical elements are inside the structure which is covering the apparatus and they are therefore subjected to the moist and corrosive atmosphere which rapidly degrades the mechanical equipment.

For circular basins provided with scraping equipment which is driven centrally, the covers used need a driving unit outside the moist and corrosive atmosphere of the apparatus. A hydraulic seal is provided for protecting the driving unit from possible releases of corrosive vapor. For these apparatus, the covers used are generally of the type of plane panels made of reinforced concrete or synthetic material. This solution is therefore complex and costly.

SUMMARY OF THE INVENTION

The present invention, which adapted to circular apparatuses, avoids these disadvantages. The invention consists essentially in providing the apparatus with a cover which is made rigid with the scraping arms, and thereof rotates with said arms.

Advantageously, the cover is made of a flexible and stretched membrane, composed of a structure in a plastic material ensuring a satisfactory mechanical strength, the outer surface of which is covered with a coating, for example polyvinyl choride.

In the center of the basin, the membrane is fixed to the periphery of the driving member for the scraping arms and made rigid with them by lacing.

The tightness of the assembly is provided by means of hydraulic seals, one in the center formed of a bell-shaped seal, fixed underneath the driving member of the scaping arms, and the other at the periphery, formed of a bent edge portion of the membrane dipping into the peripheral chute for collecting the waters.

A particular aspect of the invention provides an apparatus for thickening slurries, produced during waste water treatment, via flotation. The apparatus is formed of a circular basin having a scraping system, the scraping members of which are supported by arms which are connected to a central driving device which rotates the entire scraping assembly. A flexible cover which rotates with the scraping system is supported by the systems arms; it serves to contain the vapors within the apparatus.

The various characteristics and advantages of the invention will become more apparent from the following description of one of its possible embodiments.

BRIEF DESCRIPTION OF DRAWINGS

In this description, reference is made to the accompanying drawings wherein.

DETAILED DESCRIPTION OF THE INVENTION

Figure 1:
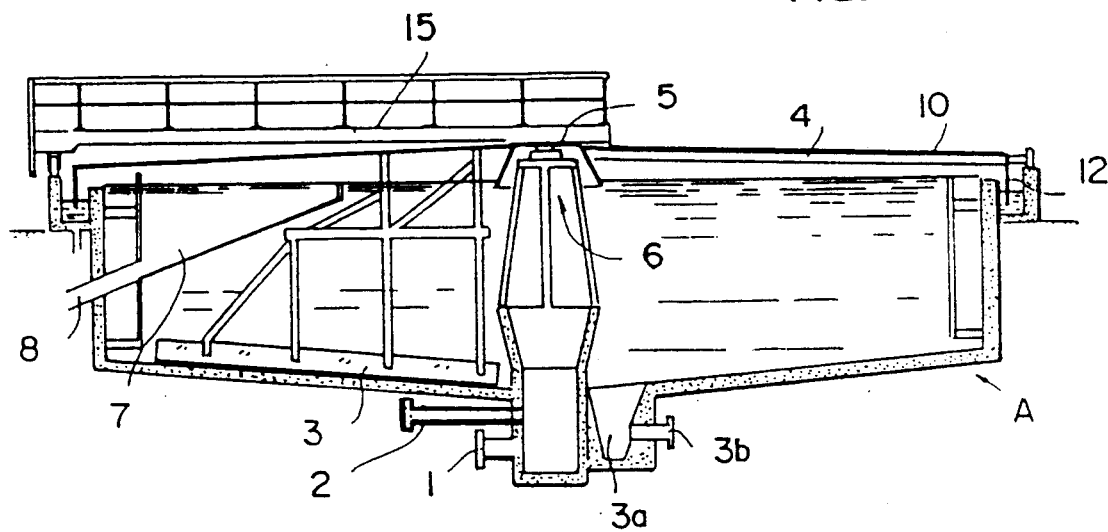
FIG. 1 is a sectional schematic view.
Figure 2:
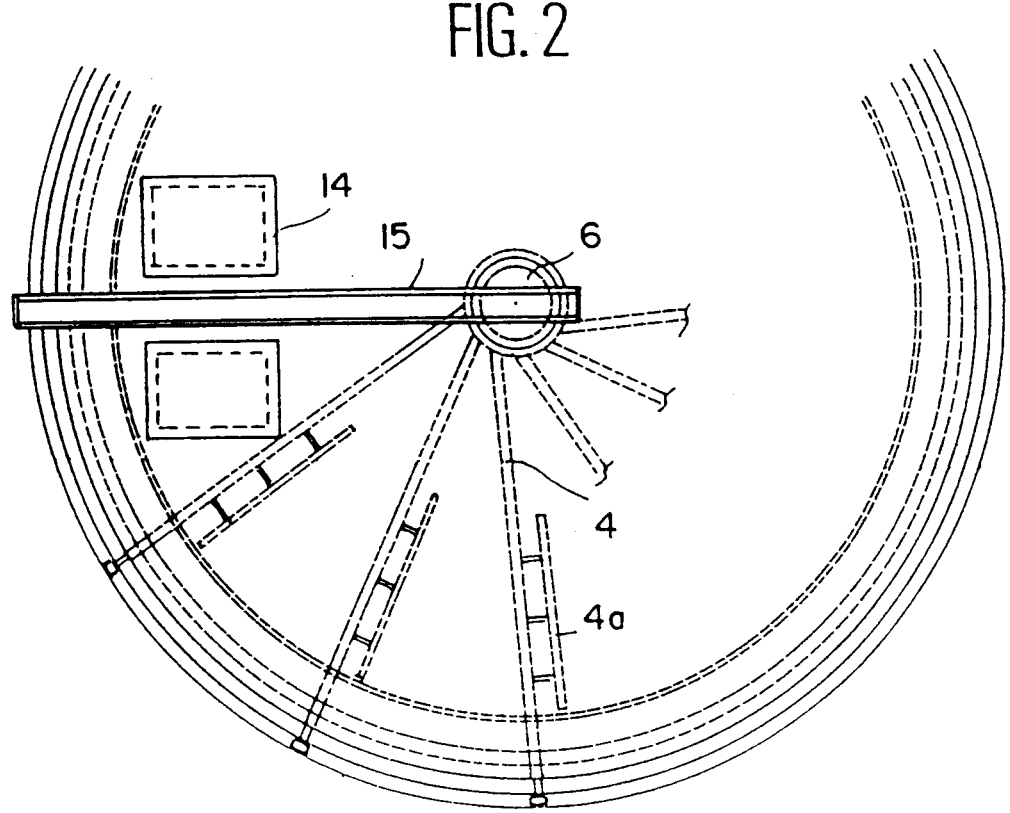
FIG. 2 is a plan view.
Figure 3:
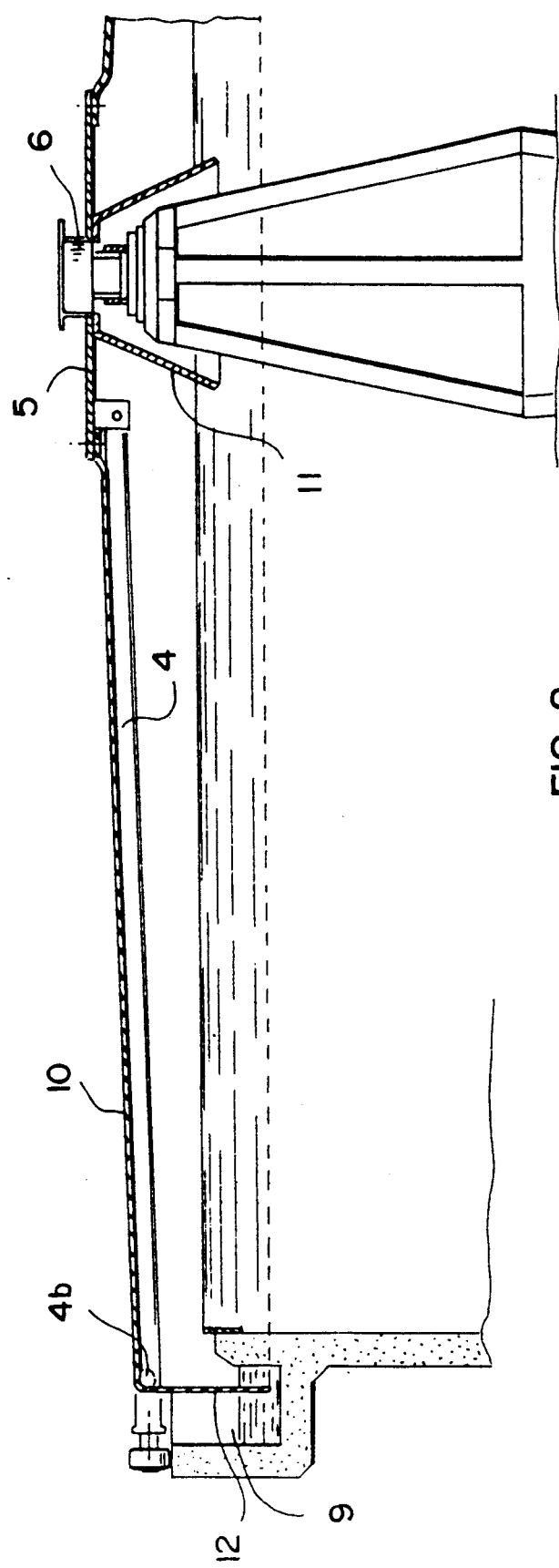
FIG. 3 is a partial view, also in section, of an improved flotation equipment according to the invention.

The flotation equipment is made of a basin A of circular shape, to the base of which are conveyed at 1 the slurries to be thickened, and at 2 the water under pressure intended for their flotation. The apparatus is fitted out with an assembly of surface scraping arms 4 (FIG. 2) articulated the shovels or scoops 4a bringing the slurries back into the discharge chute 7.

On one of the arms is articulated a bottom scraping assembly 3 for bringing back the bottom slurries into the slurry pit 3a where they are discharged via orifice 3b.

According to invention, the arms 4 of the scraping system are used for stretching, above and below said arms. A cover for example, is made of a membrane 10 of polyester covered by a coating of polyvinyl choride. This membrane is bolted by means of counter-flats onto member 5 connecting the arms to their driving system 6. It is tightened on the arms 4 and end struts 4b by lacing.

Figure 4:
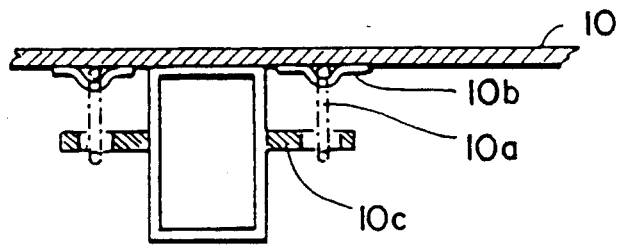
FIGS. 4 to 7 show details, FIG. 7 being a sectional view along line 7—7 of FIG. 6.
Figure 5:
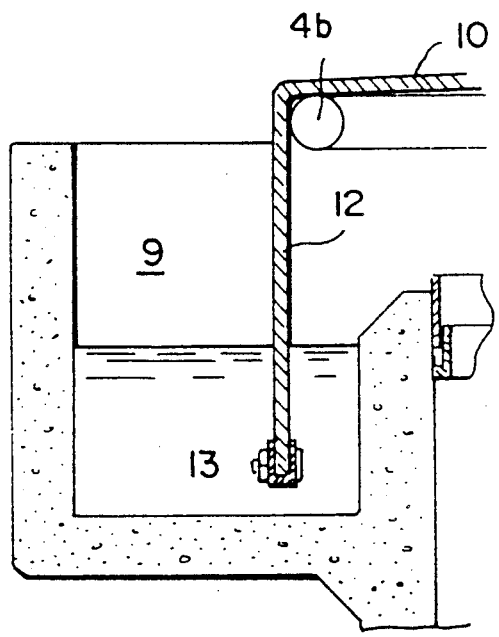
Figure 6:
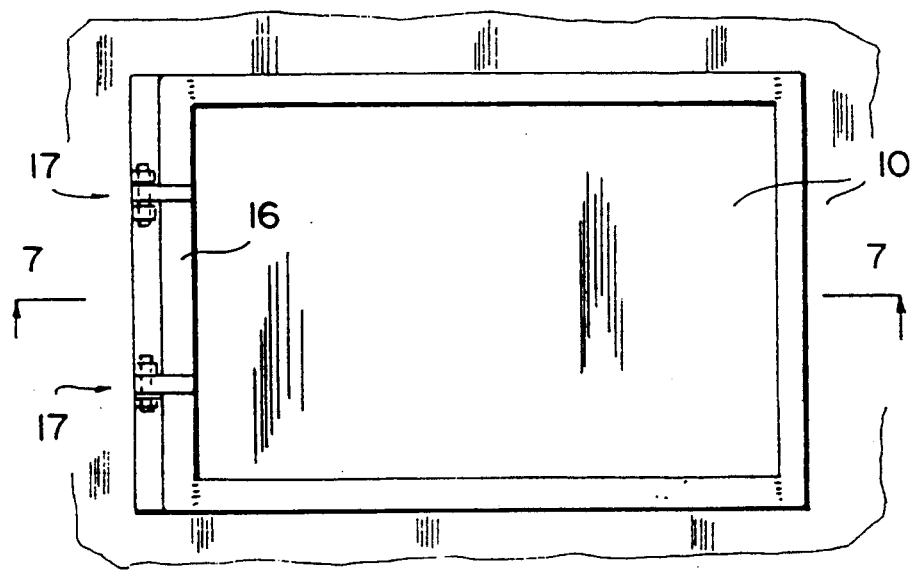
Figure 7:
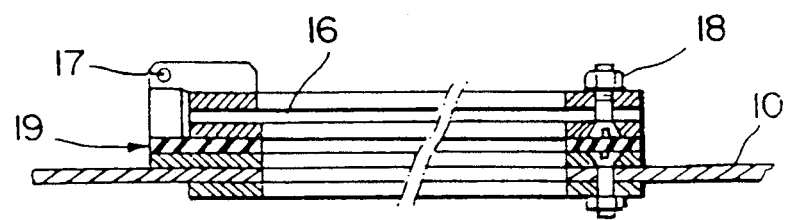

The strings 10a (see FIG. 4) are fixed on a strip with eyelets 10b welded on the membrane. They are threaded through rings 10c welded at regular intervals on arms 4. The cover is reinforced opposite the strings in order to avoid deformations due to lacing tensions.

Arms 4 are slightly inclined toward the periphery of the basin in order to allow the flow of rain water.

The tightness of the inner enclosure of basin A is provided by means of two hydraulic seals: a central hydraulic seal in the shape of a bell 11 fixed underneath the connection member 5 and dipping into the basin, and a peripheral seal made in the example discussed by a bent edge portion 12 of the membrane dipping into the water collecting chute 9, and loaded with a ballast 13.

The water level in the chute is maintained at a convenient height by a hydraulic adjustment.

Inspection flaps 14, the opening of which is controlled from gangway 15, are formed in cover 10. The flaps consist of two metallic frames 16 having a membrane sandwiched between them articulated on hinges 17. The frames are fixed by screws 18; and a foam seal 19 provides for the tightness of assembly. These flaps facilitate the access when lacing the cover and allow supervision of the operation of the apparatus.

From the foregoing, one sees that the invention provides a solution which is simple, efficient and at a cost reduced cost, due to a "rotating" cover matching perfectly the surface of the apparatus which has to be covered, while maintaining the mechanical driving members outside the noxious atmosphere prevailing inside the basin and isolating entirely the environment from this atmosphere.

The present invention may be applied to any other apparatus releasing disagreeable smells noxious to the environment and of a similar disposition.

We claim:

1. An apparatus for thickening by flotation sludge contained in a liquid produced during residual water treatment, which comprises: a basin in a circular form into which are introduced the sludge to be thickened and pressurized water for floating the sludge, the basin having a scraping system, including arms and a centrally located driving member for moving said arms in a rotating motion, said arms being attached to this central apparatus, and having means for isolating the external environment from atmosphere of the apparatus, said means consisting of a cover supported by the arms of the scraping system, means for sealing the center of the basin including a bell dipping into the basin and surrounding said driving member, and means for sealing the periphery of the basin.

2. An apparatus according to claim 1, wherein the cover encloses the totality of the basin with the exception of the driving member for the scraping system arms, the tightness of the enclosure is ensured at the periphery and the center of the basin by the sealing means.

3. An apparatus according to claim 2, wherein the means for sealing the periphery or the basin consists of a bent edge portion of the flexible membrane loaded with ballast.

4. An apparatus according to claim 1, wherein the cover is made of a flexible membrane, preferably of a plastic material having sufficient mechanical characteristics, and having at least the outer surface of the flexible membrane covered by a coating material.

5. An apparatus according to claim 4, wherein the flexible membrane is rigidly connected to the member connecting the arms of the scraping system to their rotation driving member, and is fixed to the arms by lacing.

6. An apparatus according to claim 4, wherein the flexible membrane is formed with inspection flaps facilitating its fixation on the arms and allowing supervision of the operation of the apparatus.

7. An apparatus according to claim 4, wherein the coating for flexible membrane is polyvinyl chloride.

8. An apparatus according to claim 1, wherein the scraping system arms are inclined toward the periphery of the basin in order to facilitate the flow of rain water.

9. An apparatus for thickening slurries produced during the treatment of residual water, which comprises: a basin of circular shape, into which are introduced the slurries to be thickened and the water under pressure used for their flotation, the basin having a scraping system the scraping members of which are supported by arms wherein the arms are attached to a connection member connecting the arms to centrally located driving member for driving them in rotation and having a cover for isolating the external environment from the atmosphere of the apparatus, said cover rotating with the scraping system arms, and wherein the scraping system arms are used as supports for the cover, said cover enclosing the totality of the basin with the exception of the driving member for the scraping system arms, the tightness of the enclosures being ensured at the periphery and at the center of the basin by means of hydraulic seals, said hydraulic seals consisting of the central seal of a bell dipping into the basin and surrounding said driving member, and the peripheral seal of a bent edge portion of the cover which dips into a water collection chute surrounding said basin.

10. An apparatus for thickening slurries produced during the treatment of residual waters, which comprises: a circular basin having a scraping system the scraping members of which are supported by arms which are connected to a centrally located driving member for turning them in rotation, and having a cover rotating with said arms wherein the cover is attached to the arms across the diameter of the basin, and means for sealing the periphery of the basin comprising a ballast attached to the peripheral edges of the cover which dips into a water collection chute surrounding said basin.

* * * * *